US012548704B2

(12) United States Patent
Kamiyama et al.

(10) Patent No.: US 12,548,704 B2
(45) Date of Patent: Feb. 10, 2026

(54) COIL COMPONENT, CIRCUIT BOARD, AND ELECTRONIC DEVICE

(71) Applicant: TAIYO YUDEN CO., LTD., Tokyo (JP)

(72) Inventors: Yoshiaki Kamiyama, Tokyo (JP); Kenichiro Nogi, Tokyo (JP); Hideaki Hoshino, Tokyo (JP); Shinsuke Takeoka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 961 days.

(21) Appl. No.: 17/705,542

(22) Filed: Mar. 28, 2022

(65) Prior Publication Data

US 2022/0319758 A1 Oct. 6, 2022

(30) Foreign Application Priority Data

Mar. 31, 2021 (JP) ................................ 2021-058967

(51) Int. Cl.
*H01F 5/00* (2006.01)
*H01F 1/147* (2006.01)
(Continued)

(52) U.S. Cl.
CPC ........... *H01F 27/255* (2013.01); *H01F 1/147* (2013.01); *H01F 27/29* (2013.01)

(58) Field of Classification Search
CPC ..................................................... H01F 27/255
(Continued)

(56) References Cited

U.S. PATENT DOCUMENTS

2013/0038419 A1* 2/2013 Kobayashi ................ H01F 1/33 336/200
2016/0042859 A1* 2/2016 Park ........................ H01F 17/04 336/200
(Continued)

FOREIGN PATENT DOCUMENTS

JP 2006-310844 A 11/2006
JP 2007-027354 A 2/2007
(Continued)

OTHER PUBLICATIONS

Notice of Reasons for Refusal dated Dec. 3, 2025, issued in corresponding Japanese Patent Application No. 2021-058967 with English translation (7 pgs.).
(Continued)

*Primary Examiner* — Ronald Hinson
(74) *Attorney, Agent, or Firm* — Pillsbury Winthrop Shaw Pittman, LLP

(57) ABSTRACT

A coil component comprises a coil conductor including a circling portion extending around a coil axis, a base body covering the circling portion, a first external electrode, and a second external electrode. The base body has a first surface intersecting the coil axis, a second surface opposite to the first surface, and an outer surface including a connecting surface connecting the first surface with the second surface. The outer surface of the base body includes a main body portion and at least one high resistance portion. The high resistance portion occupies an area of the connecting surface between the first external electrode and the second external electrode, other than the part occupied by the main body portion. The area extends along an entire length of a circumference of the base body around the coil axis. The high resistance portion has a higher volume resistivity than the main body portion.

14 Claims, 13 Drawing Sheets

(51) Int. Cl.
*H01F 27/255* (2006.01)
*H01F 27/29* (2006.01)

(58) Field of Classification Search
USPC ........................................................... 336/200
See application file for complete search history.

(56) References Cited

U.S. PATENT DOCUMENTS

| | | | | |
|---|---|---|---|---|
| 2018/0233272 | A1 | 8/2018 | Araki | |
| 2020/0105462 | A1 | 4/2020 | Nogi et al. | |
| 2020/0211758 | A1 | 7/2020 | Sato | |
| 2020/0365315 | A1 | 11/2020 | Kim et al. | |
| 2021/0005377 | A1 | 1/2021 | Suzuki et al. | |
| 2022/0262559 | A1* | 8/2022 | Hirukawa | H01F 17/04 |
| 2022/0277889 | A1* | 9/2022 | Koizumi | H01F 27/292 |

FOREIGN PATENT DOCUMENTS

| | | | |
|---|---|---|---|
| JP | 2017-098326 | A | 6/2017 |
| JP | 2018-133490 | A | 8/2018 |
| JP | 2020-053608 | A | 4/2020 |
| JP | 2020-107844 | A | 7/2020 |
| JP | 2021-506129 | A | 2/2021 |
| WO | 2019/044459 | A1 | 3/2019 |

OTHER PUBLICATIONS

Notice of Reasons for Refusal dated May 7, 2025, issued in corresponding Japanese Patent Application No. 2021-058967, with English translation (8 pgs.).

* cited by examiner

COIL COMPONENT, CIRCUIT BOARD, AND ELECTRONIC DEVICE

This application is based on and claims the benefit of priority from Japanese Patent Application Serial No. 2021-58967 (filed on Mar. 31, 2021), the contents of which are hereby incorporated by reference in its entirety.

TECHNICAL FIELD

The present disclosure relates to a coil component, a circuit board, and an electronic device.

BACKGROUND

Various magnetic materials have been used as a material for a base body used in electronic components. Ferrite is often used as the magnetic material for coil components such as inductors. Ferrite is suitable as the magnetic material for an inductor because of its high magnetic permeability.

In recent years, various types of electronic devices such as electronic components have been developed to accept a larger amount of current. For example, an inductor used in a DC/DC converter allows a large current to flow. As a material for a magnetic base body of an inductor used in such a circuit allowing a large current to flow, a soft magnetic material which is resistant to magnetic saturation even with a large current is used. For example, Japanese Patent Application Publication 2007-027354 discloses an inductor having a magnetic base body including metal magnetic particles consisting of soft magnetic material. This type of magnetic base body has an insulating film consisting of insulating material formed on the surface of the metal magnetic particle, where the metal magnetic particles are joined to each other via the insulating film. The insulating film formed on the surface of the metal magnetic particle is made of an insulating material which has a good insulation property such as glass or resin. The metal magnetic particles may be joined to each other by an insulating binding material.

In a known coil component, a coil conductor is embedded in a base body including metal magnetic particles, and a pair of external electrodes are connected to both ends of the coil conductor respectively. The pair of external electrodes needs to be electrically insulated from each other and are therefore disposed apart from each other on the surface of the magnetic base body.

There is a problem that a coil component having a magnetic base body including metal magnetic particles has a low dielectric strength voltage. Specifically, the metal magnetic particles are electrically conductive, and the coil component is therefore subject to a breakdown between the external electrodes disposed on the surface of the magnetic base body and between the coil conductor embedded in the magnetic base body and the external electrodes.

Japanese Patent Application Publication 2020-053608 ("the '608 Publication") discloses a coil component including a base body of a rectangular parallelepiped shape. The base body has external electrodes respectively disposed on a pair of opposed surfaces out of the six surfaces of the base body, which intersect a coil axis of the coil conductor, in order to increase a dielectric strength voltage between the coil conductor and the external electrodes. The coil component disclosed in the '608 Publication can reduce the difference of potential between the coil conductor and the external electrodes, thereby increasing a dielectric strength voltage between the coil conductor and the external electrodes.

As described above, there is a known coil component that can increase a dielectric strength voltage between the coil conductor and the external electrodes. However, no such technology has been known to increase a dielectric strength voltage between the external electrodes. It is a significant problem to increase a dielectric strength voltage between the external electrodes especially when a distance between the external electrodes is short.

SUMMARY

An object of the present invention is to relieve or reduce at least a part of the above problem. One more specific object of the present invention is to provide a coil component that can increase a dielectric strength voltage between the external electrodes. One more specific object of the present invention is to provide a coil component that can increase a dielectric strength voltage between the external electrodes disposed on a base body including metal magnetic particles.

The other objects of the present invention will be apparent with reference to the entire description in this specification. Instead of or in addition to the above problem, the invention disclosed in this specification may solve a problem acquired from the description in this specification.

The coil component according to one aspect of the present invention comprises: a coil conductor including a circling portion extending around a coil axis; a base body covering at least the circling portion of the coil conductor; a first external electrode disposed on the base body and connecting to one end of the coil conductor; and a second external electrode disposed on the base body and connecting to the other end of the coil conductor. According to one aspect of the present invention, the base body has a first surface intersecting the coil axis and having a long side and a short side, a second surface opposite to the first surface and spaced apart from the first surface and spaced apart from the first surface with a distance shorter than the long side, and an outer surface including a connecting surface connecting the first surface with the second surface. According to one aspect of the present invention, the first external electrode is disposed on the first surface, and the second external electrode is disposed on the second surface. According to one aspect of the present invention, the outer surface of the base body includes a main body portion and at least one high resistance portion, the main body portion including plural metal magnetic particles and occupying a part of the connecting surface, the at least one high resistance portion occupying an area of the connecting surface that is not occupied by the main body portion between the first external electrode and the second external electrode, the at least one high resistance portion having a higher volume resistivity than the main body portion.

According to one aspect of the present invention, the circling portion has an outer circumferential surface opposite the connecting surface of the base body. According to one aspect of the present invention, the at least one high resistance portion extends from the connecting surface to the outer circumferential surface of the circling portion.

According to one aspect of the present invention, the at least one high resistance portion extends to an inner area of the circling portion.

According to one aspect of the present invention, the at least one high resistance portion occupies an entire area of the connecting surface between the first external electrode and the second external electrode.

According to one aspect of the present invention, the at least one high resistance portion includes a first high resistance portion and a second high resistance portion disposed nearer to the second surface than the first high resistance portion.

According to one aspect of the present invention, the first external electrode includes a first plated layer, and the at least one high resistance portion is disposed to contact the first external electrode.

According to one aspect of the present invention, the second external electrode includes a second plated layer, and the at least one high resistance portion is disposed to contact the second external electrode.

According to one aspect of the present invention, each of the plural metal magnetic particles included in the main body portion includes Fe and at least one element out of Si, Ti and Zr. According to one aspect of the present invention, the at least one high resistance portion includes plural other metal magnetic particles. According to one aspect of the present invention, each of the plural other metal magnetic particles includes Fe and at least one element out of Si, Ti and Zr. According to one aspect of the present invention, a content ratio of a total of Si, Ti and Zr to Fe in each of the plural other metal magnetic particles included in the at least one high resistance portion is higher than a content ratio of a total of Si, Ti and Zr to Fe in each of the plural metal magnetic particles included in the main body portion.

According to one aspect of the present invention, each of the plural other metal magnetic particles includes on a surface thereof an insulating film consisting of insulating material.

According to one aspect of the present invention, the plural other metal magnetic particles have a smaller average particle size than the plural metal magnetic particles included in the main body portion.

According to one aspect of the present invention, a relative magnetic permeability of the at least one high resistance portion is 10% or greater of a relative magnetic permeability of the main body portion.

According to one aspect of the present invention, a relative magnetic permeability of the high resistance portion is less than 10% of a relative magnetic permeability of the main body portion.

The circuit board according to one aspect of the present invention comprises any one of the above-described coil components.

The electronic device according to one aspect of the present invention comprises the above-described circuit board.

According to at least one embodiment of the present invention, it is possible to provide a coil component that can increase a dielectric strength voltage between the external electrodes.

DESCRIPTION OF THE EMBODIMENTS

Figure 1:
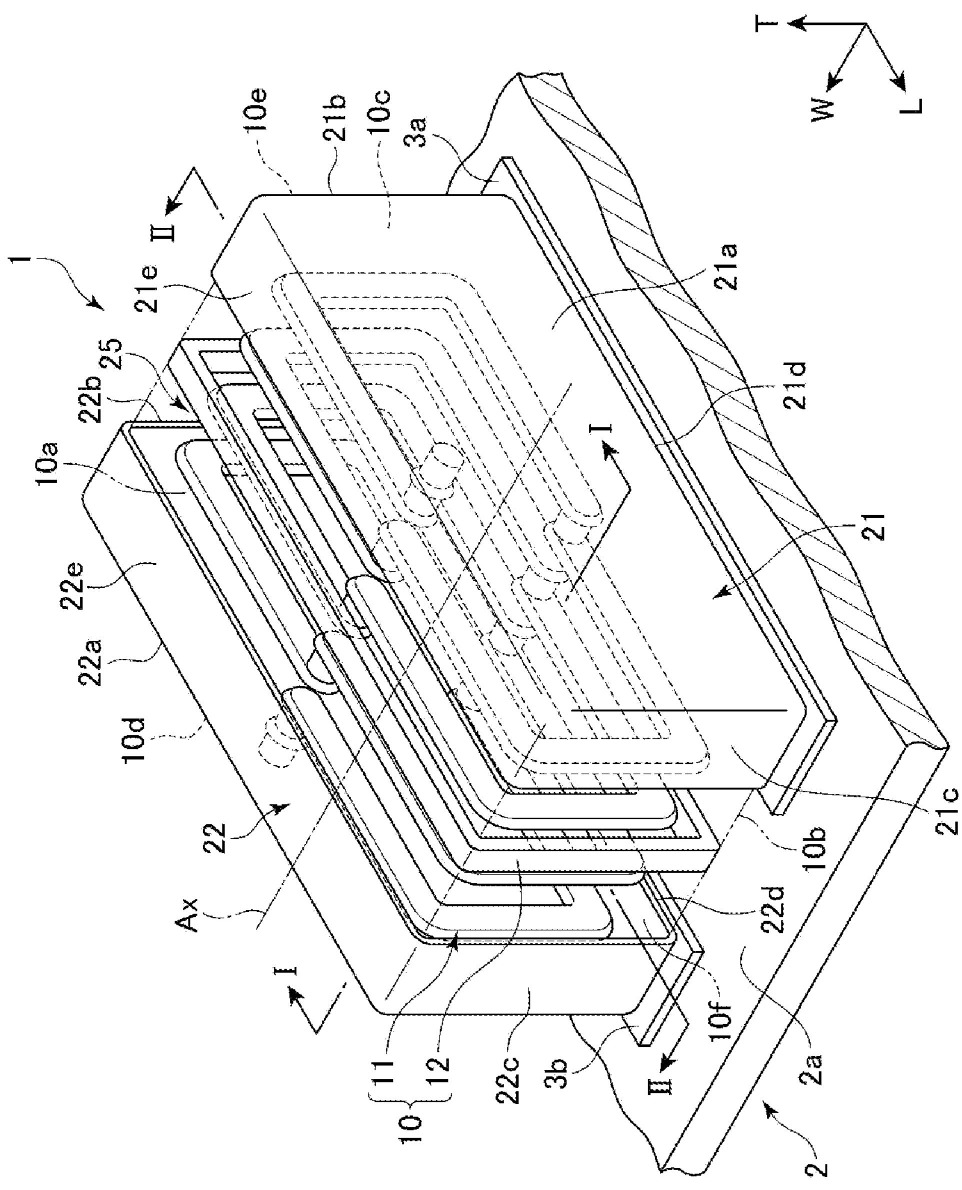
FIG. 1 is a perspective view schematically showing a coil component according to one embodiment of the present invention.

Various embodiments of the present invention will be described hereinafter with reference to the appended drawings. Throughout the drawings, the same components are denoted by the same reference numerals. It should be noted that the drawings do not necessarily appear in accurate scales for convenience of description. The following embodiments of the present invention do not limit the scope of the claims. The elements described in the following embodiments are not necessarily essential to solve the problem to be solved by the invention.

Figure 2A:
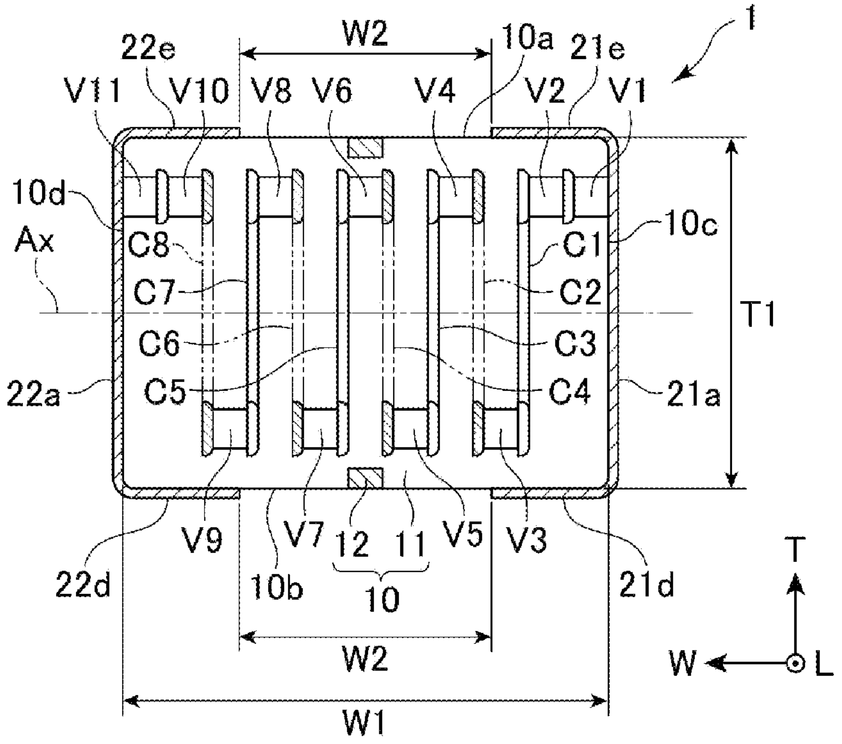
FIG. 2A is a cross sectional view schematically showing a cross section of the coil component in FIG. 1, cut along a plane extending along a coil axis.
Figure 2B:
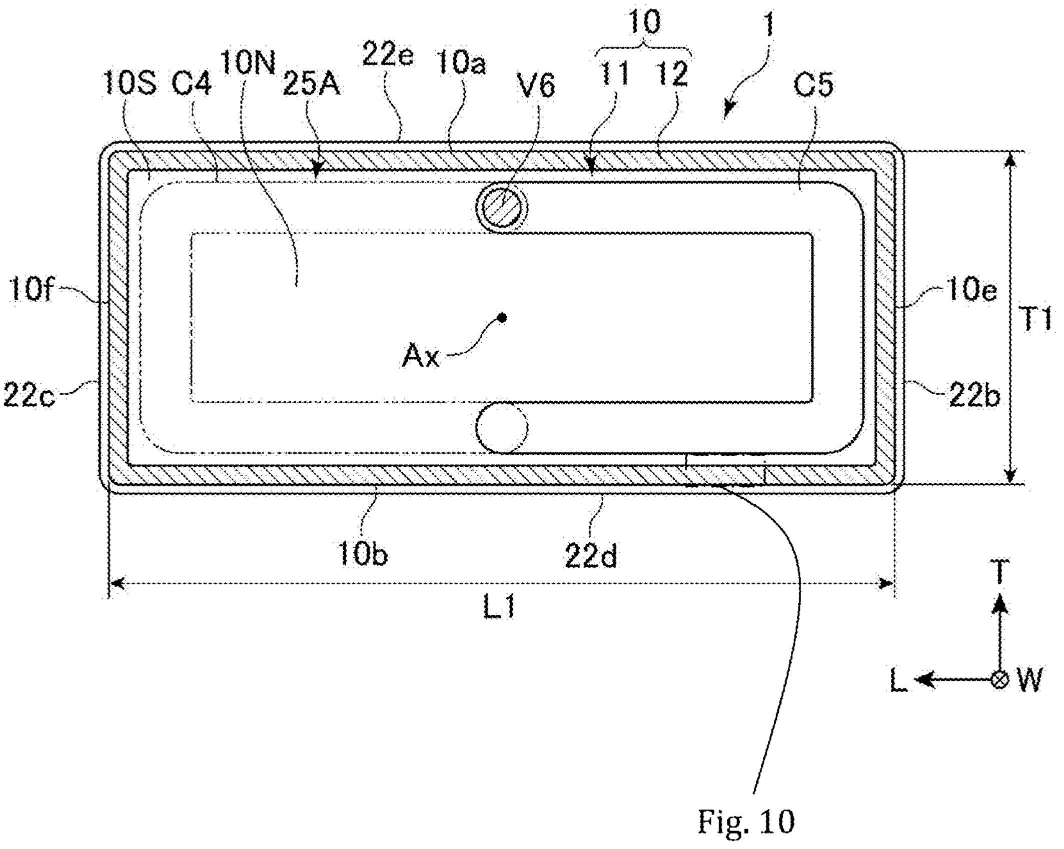
FIG. 2B is a cross sectional view schematically showing a cross section of the coil component in FIG. 1, cut along a plane perpendicular to the coil axis.

A coil component 1 according to one embodiment of the present invention will be described with reference to FIGS. 1 to 3. FIG. 1 is a perspective view schematically showing the coil component 1. FIG. 2A is a cross sectional view schematically showing a cross section of the coil component 1 cut along the I-I line in FIG. 1. FIG. 2B is a cross sectional view schematically showing a cross section of the coil component 1 cut along the II-II line in FIG. 1. As shown, the coil component 1 includes a base body 10, a coil conductor 25 disposed in the base body 10, an external electrode 21 disposed on a surface of the base body 10, and an external electrode 22 disposed on a surface of the base body 10 at a position spaced apart from the external electrode 21. The base body 10 includes a magnetic material. Accordingly, the base body 10 may be referred to as a magnetic base body 10 in this specification. In FIG. 1, the base body 10 appears transparent, such that the coil conductor 25 provided in the base body 10 is shown.

In this specification, the arrangement, dimensions, shapes, and other aspects of the members may be herein described based on the “L axis”, the “W axis”, and the “T axis” shown in the drawings. In this specification, the "length" direction, the "width" direction, and the "thickness" direction of the coil component 1 may be herein referred to as the "L axis" direction, the "W axis" direction, and the "T axis" direction, respectively. The "thickness" direction may be also referred to as the "height" direction. The L axis, the W axis, and the T axis are perpendicular to each other.

The coil component 1 may be mounted on a mounting substrate 2*a*. The mounting substrate 2*a* has land portions 3*a*, 3*b* disposed thereon. The coil component 1 is mounted on the mounting substrate 2*a* by connecting the external electrode 21 to the land portion 3*a* and connecting the external electrode 22 to the land portion 3*b*. A circuit board 2 according to one embodiment of the present invention includes the coil component 1 and the mounting substrate 2*a* having the coil component 1 mounted thereon. The circuit board 2 can be installed in various electronic devices. The electronic devices in which the circuit board 2 can be installed include smartphones, tablets, game consoles, electrical components of automobiles, a server, and various other electronic devices. For clarity, the mounting substrate 2*a* and the land portions 3*a*, 3*b* are not shown in the drawings other than FIG. 1.

The coil component 1 may be an inductor, a transformer, a filter, a reactor and any one of various other coil components. The coil component 1 may be a coupled inductor, a choke coil, and any one of various other magnetically coupled coil components. The coil component 1 may be, for example, a power inductor used in a DC/DC converter. Applications of the coil component 1 are not limited to those explicitly described herein.

The base body 10 is made of magnetic material and formed in a substantially rectangular parallelepiped shape. In one embodiment of the present invention, the base body 10 is configured to have a dimension in the L-axis direction (length dimension) L1 larger than a dimension in the W-axis direction (width dimension) W1 and a dimension in the T-axis direction (height dimension) T1. For example, the length dimension L1 is from 1.0 to 6.0 mm, the width dimension W1 is from 0.5 to 4.5 mm, and the height dimension T1 is from 0.5 to 4.5 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense. The shape of the base body 10 is not limited to those specified herein.

The base body 10 has a first principal surface 10*a*, a second principal surface 10*b*, a first end surface 10*c*, a second end surface 10*d*, a first side surface 10*e*, and a second side surface 10*f*. The outer surface of the magnetic base body 10 is defined by these six surfaces. The first principal surface 10*a* and the second principal surface 10*b* are at the opposite ends in the height direction of the base body 10, the first end surface 10*c* and the second end surface 10*d* are at the opposite ends in the width direction of the base body 10, and the first side surface 10*e* and the second side surface 10*f* are at the opposite ends in the length direction of the base body 10. The first principal surface 10*a* is spaced apart from the second principal surface 10*b* with the height dimension T1, the first end surface 10*c* is spaced apart from the second end surface 10*d* with the width dimension W1, and the first side surface 10*e* is spaced apart from the second side surface 10*f* with the length dimension L1, As shown in FIG. 1, the first principal surface 10*a* lies on the top side of the base body 10, and therefore, the first principal surface 10*a* may be herein referred to as "the top surface." Likewise, the second principal surface 10*b* may be referred to as "the bottom surface." The coil component 1 is disposed such that the second principal surface 10*b* faces the mounting substrate 2*a*, and therefore, the second principal surface 10*b* may be herein referred to as "the mounting surface." The base body 10 has an outer surface including a surface connecting the first end surface 10*c* with the second end surface 10*d*, which may be herein referred to as the "connecting surface." In the illustrated embodiment, the first end surface 10*c* and the second end surface 10*d* are connected by the top surface 10*a*, the bottom surface 10*b*, the first side surface 10*e*, and the second side surface 10*f*. The surface including the top surface 10*a*, the bottom surface 10*b*, the first side surface 10*e*, and the second side surface 10*f* may be referred to as a "connecting surface" or a "connecting surface of the base body 10."

As described above, the length dimension L1 of the base body 10 is larger than the height dimension T1. Accordingly, among the sides defining the first end surface 10*c*, the sides extending in the L-axis direction (namely, a ridge line between the first end surface 10*c* and the top surface 10*a* and a ridge line between the first end surface 10*c* and the bottom surface 10*b*) are long sides of the first end surface 10*c*, and the sides extending in the T-axis direction (namely, a ridge line between the first end surface 10*c* and the first side surface 10*e* and a ridge line between the first end surface 10*c* and the second side surface 10*f*) are short sides of the first end surface 10*c*. In the illustrated embodiment, the base body 10 has a hexahedron shape. The shape of the first end surface 10*c* as viewed from the front (as viewed from the W-axis direction) is therefore the same as the cross-sectional shape as the base body 10 shown in FIG. 2B. In the illustrated embodiment, among the four sides defining a cross section of the base body 10 shown in FIG. 2B, the two sides extending in the L-axis direction correspond to the long sides of the first end surface 10*c*, and the two sides extending in the T-axis direction correspond to the short sides of the first end surface 10*c*. The L-axis direction is a longitudinal direction of the coil component 1.

In the illustrated embodiment, the surfaces 10*a* to 10*f* of the base body 10 are shown as flat. Alternatively, the surfaces 10*a* to 10*f* may be curved. Each of the surfaces 10*a* to 10*f* is shown to be perpendicular to an adjacent surface. Alternatively, each of the surfaces 10*a* to 10*f* may not be perpendicular to an adjacent surface. The base body 10 may have rounded corners. The ridge lines of the base body 10, which indicate borders between adjacent surfaces of the surfaces 10*a* to 10*f*, may be non-straight lines and may be curved according to the shape and arrangement of the surfaces 10*a* to 10*f*.

In one embodiment of the present invention, the coil conductor 25 has a circling portion 25A spirally extending around the coil axis Ax. The coil conductor 25 is disposed inside the base body 10. When the base body 10 is viewed from the W-axis direction, an area inside of the circling portion 25A of the base body 10 is referred to as a core area 10N, and an area between the circling portion 25A and an outer surface of the base body 10 is referred to as a margin area 10S. In one embodiment, the coil conductor 25 is disposed such that the coil axis Ax intersects the first end surface 10*c*. The coil axis Ax may intersect the second end surface 10*d*. The coil conductor 25 may be disposed such that the coil axis Ax extends in parallel to at least one of the top surface 10*a*, bottom surface 10*b*, the first side surface 10*e* and the second side surface 10*f*. The coil conductor 25 is disposed in the base body 10 such that the coil axis Ax intersects the first end surface 10*c* of the base body 10. This allows the circling portion 25A to have a large dimension in the longitudinal direction of the coil component 1. As a result, it is possible for the base body 10 having a given dimension to increase inductance of the coil component 1 and suppress magnetic saturation in the core area 10N inside of the circling portion 25A.

In one embodiment of the present invention, the base body 10 may be configured to have a height dimension T1 larger than a width dimension W1. This allows the circling portion 25A to have a large dimension in the T-axis direction. As a result, it is possible for the base body 10 having a given dimension to further increase inductance of the coil component 1 and suppress magnetic saturation in the core area 10N inside of the circling portion 25A.

In one embodiment of the present invention, the base body 10 has a main body portion 11 and a high resistance portion 12. The high resistance portion 12 is a portion having a higher volume resistivity than the main body portion 11 among the base body 10. In the drawings, a border between the main body portion 11 and the high resistance portion 12 is shown. However, in a base body of an actual coil component that the present invention is applied, a border may not be visible between a portion corresponding to the main body portion 11 and a portion corresponding to the high resistance portion 12. The volume resistivity of the high resistance portion 12 is for example $1\times10^6$ Ω·cm or greater, preferably $1\times10^8$ Ω·cm or greater. The base body 10 may include one or more high resistance portions 12. The base body 10 in the coil component 1 includes a single high resistance portion 12. The main body portion 11 may be defined as an area of the base body 10 other than the high resistance portion 12. The base body 10 may include an element other than the main body portion 11 and the high resistance portion 12. The main body portion 11 occupies a part of the connecting surface of the base body 10. In the embodiment shown in FIGS. 2A and 2B, the high resistance portion 12 occupies a part of the connecting surface of the base body 10 near a center of the base body 10 in the W-axis direction, and the main body portion 11 occupies the remaining part of the connecting surface. The high resistance portion 12 is composed of a material for exhibiting a higher volume resistivity than the main body portion 11. A higher percentage of the high resistance portion 12 occupying the base body 10 can cause a magnetic property of the coil component 1 to deteriorate. For example, if the high resistance portion 12 covers all the connecting surface of the base body 10, this can cause a magnetic property of the coil component 1 to deteriorate. Accordingly, at least a part of the connecting surface of the base body 10 is occupied by the main body portion 11.

A relative magnetic permeability of the high resistance portion 12 may be 10% or less of a relative magnetic permeability of the main body portion 11. Accordingly, the high resistance portion 12 can function as a magnetic gap to suppress the occurrence of magnetic saturation in the coil component 1. A relative magnetic permeability of the high resistance portion 12 may be 10% or greater of a relative magnetic permeability of the main body portion 11. Accordingly, it is possible to prevent reduction of inductance due to the high resistance portion. The relative magnetic permeability of the high resistance portion 12 can be determined in accordance with the characteristic required for the coil component 1.

In the illustrated embodiment, the high resistance portion 12 is disposed between the external electrode 21 and the external electrode 22 in the W-axis direction. More specifically, in the illustrated embodiment, the high resistance portion 12 is disposed at the same position as the via conductor V6 in the W-axis direction. The high resistance portion 12 forms a part of the outer surface of the base body 10. That is, the high resistance portion 12 is exposed on the outer surface of the base body 10. The high resistance portion 12 extends along an entire length of a circumference of the base body 10 around the coil axis Ax. The high resistance portion 12 occupies a part of an area between the external electrode 21 and the external electrode 22 on the connecting surface of the base body 10 in the W-axis direction. In the embodiment shown in FIG. 2, the high resistance portion 12 occupies an area other than the area indicated by the main body portion 11 among the connecting surface of the base body 10. With the above-described structure and arrangement of the high resistance portion 12, going from the external electrode 21 to the external electrode 22 through the outer surface (connecting surface) of the base body 10 along the W-axis direction always includes crossing the high resistance portion 12. In other words, the high resistance portion 12 intervenes between the external electrode 21 and the external electrode 22 on the connecting surface of the base body 10. The high resistance portion 12 may extend into the base body 10. In other words, the high resistance portion 12 may extend to any position between the outer surface of the base body 10 and the coil axis Ax in a radial direction having the coil axis AX as a center and perpendicular to the coil axis Ax.

In one embodiment of the present invention, the base body 10 is composed of magnetic material. As a magnetic material for the base body 10, for example, a soft magnetic alloy material can be used. The soft magnetic metal material for the base body 10 may be, for example, (1) metal Fe or metal Ni, (2) an Fe—Si—Cr alloy, an Fe—Si—Al alloy, or an Fe—Ni alloy, (3) an amorphous Fe—Si—Cr—B—C, or Fe—Si—B—Cr, or (4) a mixed material obtained by mixing these materials. The soft magnetic metal material for the base body 10 may include at least one of Si and Zr, instead of or in addition to Si. The base body 10 may be composed of plural metal magnetic particles 14, 16 consisting of soft magnetic metal material. The surfaces of the plural metal magnetic particles 14, 16 included in the base body 10 are formed thereon with insulating films 18, 20 (respectively). Each of the plural metal magnetic particles 14, 16 included in the base body 10 may be joined to an adjacent metal magnetic particle via an insulating film. The insulating film may include oxide of a constituent element of the metal magnetic particle or may be made of an insulating material other than the constituent element of the metal magnetic particle. In one embodiment, a relative magnetic permeability of the magnetic material for the base body 10 is less than 100. The base body 10 may include a resin. The base body 10 may include a resin binding material that binds the metal magnetic particles consisting of soft magnetic metal material. The binding material consists of, for example, thermosetting material having a good insulation property. The resin material used for a binding material has a smaller magnetic permeability than the first magnetic material. The resin material used for a binding material may be an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

The high resistance portion 12 may include metal magnetic particles of a different type from those included in the main body portion 11. For example, the metal magnetic particles 16 included in the high resistance portion 12 have a smaller average particle size than the metal magnetic particles 14 included in the main body portion 11. The "average particle size" of the metal magnetic particles in this specification are determined in the following manner. The base body 10 is cut along the thickness direction (the T axis direction) to expose a sectional surface. The sectional surface is photographed using a scanning electron microscope (SEM) to obtain an SEM image at 1000 to 2000-fold magnification, and the particle size distribution is determined based on the SEM image. The particle size distribution obtained in this way is used to determine the average particle size. For example, the 50th percentile (D50) of the particle size distribution obtained based on the SEM image can be used as the average particle size of the metal magnetic particles. Each of the metal magnetic particles has an insulating film on its surface. This allows a volume resistivity of the high resistance portion 12 including metal magnetic particles 16 having a relatively small average particle size to be larger than a volume resistivity of the main body portion 11 including metal magnetic particles 14 having a relatively large average particle size. For example, the metal magnetic particles 14 included in the main body portion 11 have an average particle size from 2 to 20 μm, and the metal magnetic particles 16 included in the high resistance portion 12 have an average particle size from 0.5 to 3 μm.

In one embodiment of the present invention, the dimension of the high resistance portion 12 in the W-axis direction is triple or more the average particle size of the plural metal magnetic particles included in the high resistance portion 12. If the average particle size of the plural metal magnetic particles included in the high resistance portion 12 is 0.5 μm as described above, the dimension of the high resistance portion 12 in the W-axis direction is 1.5 μm or greater.

For example, a composition of the metal magnetic particle included in the high resistance portion 12 may be different from or the same as a composition of the metal magnetic particle included in the main body portion 11. A volume resistivity of the metal magnetic particles including Fe gets higher according to a content ratio of Si, Ti r Zr to Fe. In one embodiment of the present invention, a content ratio of a total of Si, Ti and Zr to Fe in each of the plural metal magnetic particles included in the high resistance portion 12 is higher than a content ratio of a total of Si, Ti and Zr to Fe in each of the plural metal magnetic particles included in the main body portion 11. For example, a content ratio of a total of Si, Ti and Zr to Fe in each of the plural metal magnetic particles included in the high resistance portion 12 is, for example, 10% or greater. A content ratio of a total of Si, Ti and Zr to Fe in each of the plural metal magnetic particles included in the main body portion 11 is, for example, less than 10%. The content ratio of elements in the metal magnetic particle in this specification indicates a content ratio of elements in the metal magnetic particle included in the base body 10 after having subjected to a heat treatment.

As described above, the coil conductor 25 has one end exposed out of the first end surface 10*c* and is connected to the external electrode 21 at the one end exposed out of the first end surface 10*c*. The coil conductor 25 has the other end exposed out of the second end surface 10*d* and is connected to the external electrode 22 at the other end exposed out of the second end surface 10*d*. Accordingly, the circling portion 25A of the coil conductor 25 is embedded in the base body 10. In other words, the circling portion 25A is covered by the outer surface of the base body 10. In the illustrated embodiment, the coil conductor 25 has opposite ends exposed out of the base body 10, and all the other portions of the coil conductor 25 are disposed inside the base body 10. In one embodiment of the present invention, one end of the coil conductor 25 is exposed out of the first end surface 10*c* of the base body 10 at a position nearer to the top surface 10*a* than the bottom surface 10*b*. The other end of the coil conductor 25 is exposed out of the second end surface 10*d* of the base body 10 at a position nearer to the top surface 10*a* than the bottom surface 10*b*.

In the illustrated embodiment, the coil conductor 25 includes conductor patterns C1 to C8 extending around the coil axis Ax and via conductors V1 to V11 extending along the coil axis Ax. Each of the conductor patterns C1 to C8 is extended by about a ½ turn (about 180 degrees) in a circumferential direction of the coil axis Ax. Each of the conductor patterns C1 to C8 is connected to an adjacent conductor pattern by a corresponding via conductor among the via conductors V3 to V9. For example, the conductor pattern C1 is connected to an adjacent conductor pattern C2 by the via conductor V3. The via conductors V2 to V10 are connected to the ends of the conductor patterns C1 to C8 at one end of the circumferential direction. For example, one end of the conductor pattern C1 is connected to the via conductor V1 and the other end is connected to the via conductor V2. The conductor patterns C1 to C8 and the via conductors V3 to V9 are connected in this manner to form a circling portion 25A spirally extending around the coil axis Ax. One end of the circling portion 25A is connected to the external electrode 21 via the via conductors V2, V1, and the other end of the circling portion 25A is connected to the external electrode 22 via the via conductors V10, V11. The via conductors V1 and V2 are leading conductors for connecting the one end of the circling portion 25A to the external electrode 21. The via conductors V10 and V11 are leading conductors for connecting the other end of the circling portion 25A to the external electrode 22. The illustrated shape and arrangement of the conductor patterns C1 to C8 are only examples. Various shapes of the conductor pattern other than the shown examples of the present invention can be applied.

In one embodiment of the present invention, the external electrode 21 is disposed on the first end surface 10*c* of the base body 10, and the external electrode 22 is disposed on the second end surface 10*d* of the base body 10. In the illustrated embodiment, the external electrode 21 and the external electrode 22 have a five-sided electrode shape where the external electrode 21 and the external electrode 22 contact five of the six outer surfaces of the base body 10. Specifically, the external electrode 21 includes a main electrode portion 21*a* covering the first end surface 10*c* of the base body 10, a plate-like flange portion 21*b* connecting to a negative side end of the main electrode portion 21*a* in the L-axis direction and extending along the first side surface 10*e* of the base body 10, a plate-like flange portion 21*c* connecting to a positive side end of the main electrode portion 21*a* in the L-axis direction and extending along the second side surface 10*f* of the base body 10, a flange portion 21*d* connecting to a bottom end of the main electrode portion 21*a* and extending along the bottom surface 10*b* of the base body 10, and a flange portion 21*e* connecting to a top end of the main electrode portion 21*a* and extending along the top surface 10*a* of the base body 10. The external electrode 22 includes a main electrode portion 22*a* covering the second end surface 10*d* of the base body 10, a plate-like flange portion 22*b* connecting to a negative side end of the main electrode portion 22*a* in the L-axis direction and extending along the first side surface 10*e* of the base body 10, a plate-like flange portion 22*c* connecting to a positive side end of the main electrode portion 22*a* in the L-axis direction and extending along the second side surface 10*f* of the base body 10, a flange portion 22*d* connecting to a bottom end of the main electrode portion 22*a* and extending along the bottom surface 10*b* of the base body 10, and a flange portion 22*e* connecting to a top end of the main electrode portion 22*a* and extending along the top surface 10*a* of the base body 10. The illustrated configuration and arrangement of the external electrode 21 and the external electrode 22 are only examples. The configuration and arrangement of the external electrode 21 and the external electrode 22 can be changed accordingly unless there is inconsistency with the effects of the invention as claimed.

The external electrode 21 and the external electrode 22 are arranged such that the tip ends of corresponding flange portions are opposite to each other. For example, as explicitly shown in FIG. 2A, a tip end of the flange portion 21*d* (a positive side end in the W-axis direction) of the external electrode 21 is opposite to a tip end (a negative side end in the W-axis direction) of the flange portion 22*d* of the external electrode 22. The external electrode 21 and the external electrode 22 are configured and arranged to be spaced apart from each other with a distance W2. Specifically, as shown in FIG. 2A, the distance between the tip ends of the corresponding flange portions is referred to as "W2."

The external electrode 21 is connected to the land portion 3*a* at any one of the flange portions 21*b* to 21*e*. The external electrode 22 is connected to the land portion 3*b* at any one of the flange portions 22*b* to 22*e*. In the illustrated embodiment, the external electrode 21 is connected to the land portion 3*a* at the flange portion 21*d*, and the external electrode 22 is connected to the land portion 3*b* at the flange portion 22*d*.

The external electrode 21 may include plural layers including a base electrode layer and a plated layer. The base electrode layer may be formed by applying a conductive paste on a surface of the base body 10 and heating the conductive paste. The conductive paste is a paste obtained by mixing and kneading metal particles such as Ag with a resin. The plated layer is, for example, a nickel-plated layer. The plated layer is formed on a surface of the base electrode layer by, for example, an electrolytic plating method. The plated layer may be double-layer. In a case where the plated layer is double-layer, the first plated layer contacting the base electrode layer may be a nickel-plated layer and the second plated layer formed on the first plated layer may be a tin-plated layer. As with the external electrode 21, the external electrode 22 may include plural layers including a base electrode layer and a plated layer. Unless there is inconsistency, the description relating to the external electrode 21 applies to the external electrode 22.

In the illustrated embodiment, the first end surface 10*c* and the second end surface 10*d* are covered by the external electrode 21 and the external electrode 22 respectively. This prevents magnetic flux flowing in the base body 10 along the coil axis Ax from leaking out of the base body 10 through the first end surface 10*c* or the second end surface 10*d* when a current flows in the coil conductor 25. Accordingly, it is possible to increase inductance of the coil component 1. In the illustrated embodiment, one end of the coil conductor 25 is exposed out of the first end surface 10*c* of the base body 10 at a position nearer to the top surface 10*a* than the bottom surface 10*b*, and the other end of the coil conductor 25 is exposed out of the second end surface 10*d* of the base body 10 at a position nearer to the top surface 10*a* than the bottom surface 10*b*. This allows magnetic flux flowing in the circling portion 25A along the coil axis Ax to, after flowing out of the circling portion 25A, flow in an area between the coil conductor 25 and the top surface 10*a* more than an area between the coil conductor 25 and the bottom surface 10*b*. Accordingly, it is possible to further reduce leakage of the magnetic flux from the bottom surface 10*b*.

The coil component 1 has the high resistance portion 12 between the external electrode 21 and the external electrode 22 on the connecting surface on an outer surface of the base body 10. This prevents a leak current from flowing along the connecting surface of the base body 10 between the external electrode 21 and the external electrode 22. As shown in FIG. 2A, the external electrode 21 and the external electrode 22 are closest at the tip ends of the flange portions (for example, the flange portion 21*d* and the flange portion 22*d*) disposed opposite to each other. This causes a leak current to flow between the external electrode 21 and the external electrode 22 along the connecting surface of the base body 10 when a breakdown occurs between the external electrode 21 and the external electrode 22. The coil component 1 has the high resistance portion 12 between the external electrode 21 and the external electrode 22 on the connecting surface on an outer surface of the base body 10. This prevents a leak current from occurring between the external electrode 21 and the external electrode 22. Accordingly, it is possible to increase a dielectric strength voltage between the external electrode 21 and the external electrode 22.

An example method for manufacturing a coil component 1 according to one embodiment of the present invention will now be described. The coil component 1 may be manufactured by the sheet laminating method. Specific steps for manufacturing the coil component 1 by the sheet laminating method will be described.

For manufacturing the coil component 1 by the sheet laminating method, first, a magnetic sheet in the form of a sheet is fabricated from a magnetic material. Plural magnetic sheets are then fabricated. The magnetic sheet is formed such that the sheet has a rectangular shape having a long side with substantially the length dimension L1 and a short side with substantially the height dimension T1. The magnetic sheet is fabricated by, for example, mixing and kneading metal magnetic particles with a resin to obtain slurry and placing the slurry in a mold where a predetermined molding pressure is applied. The resin to be mixed and kneaded with metal magnetic particles may be, for example, a resin having a good insulation property such as polyvinyl butyral (PVB) resin or epoxy resin.

Next, through-holes for disposing the via conductors V1 to V11 are formed in the magnetic sheets. The magnetic sheet formed with a through-hole for disposing the via conductor V6 is also formed with a ring-shaped through-hole for disposing the high resistance portion 12. Following this, a conductive paste is applied on the magnetic sheets formed with through-holes by a known method such as screen printing, so that unfired conductor patterns are formed, which will be conductor patterns C1 to C8 after firing. At this time, the through-holes formed in the magnetic sheets are filled in with the conductive paste to form unfired via conductors, which will be via conductors V1 to V11 after firing. The ring-shaped through-hole formed in the magnetic sheet which is filled with an unfired via conductor to be the via conductor V6 is filled with slurry, which is obtained by mixing and kneading metal magnetic materials with a resin, by, for example, screen printing. As a result, a precursor of the high resistance portion 12 is formed in the ring-shaped through-hole. The metal magnetic particles included in the slurry filling the ring-shaped through-hole may have a smaller average particle size than the metal magnetic particles included in the material for the magnetic sheet.

The magnetic sheets formed with plural unfired conductor patterns, plural unfired via conductors, and/or precursors of high resistance portions 12 are stacked together. The stacked magnetic sheets are bonded together by thermal compression to fabricate a sheet laminate. Next, the sheet laminate is diced to a desired size by using a cutter such as a dicing machine or a laser processing machine to make a chip laminate.

The chip laminate is then defatted. The defatted chip laminate is subjected to a heat treatment. The heat treatment for the chip laminate is performed at a temperature of, for example, from 400 to 900 degrees Celsius for from 20 to 120 minutes. Accordingly, the base body 10 including the coil conductor 25 inside is produced. With the heat treatment, the high resistance portion 12 is obtained from its precursor.

Next, the external electrode 21 and the external electrode 22 are formed on a surface of the base body 10 obtained by the heat treatment. The external electrode 21 is formed by applying a conductive paste on the first end surface 10*c* of the base body 10 to form a base electrode layer and then forming a plated layer on a surface of the base electrode layer by, for example, an electrolytic plating method. The plated layer may be double-layer. In a case where the plated layer is double-layer, the first plated layer contacting the base electrode layer may be a nickel-plated layer and the second plated layer formed on the first plated layer may be a tin-plated layer.

By the above-described process, the coil component 1 can be obtained. In the manufacturing method of the coil component 1 as described above, a direction of stacking the magnetic sheets corresponds to the W-axis direction in FIG. 1 to FIG. 3. Specifically, each of the plural magnetic sheets is a plate-like sheet extending along the T-L surface, and these plural magnetic sheets are stacked together in the W-axis direction.

The coil component 1 may be manufactured by a known method other than the sheet fabrication method, such as a compression molding method, a slurry build method, or a thin film processing method.

Figure 3A:
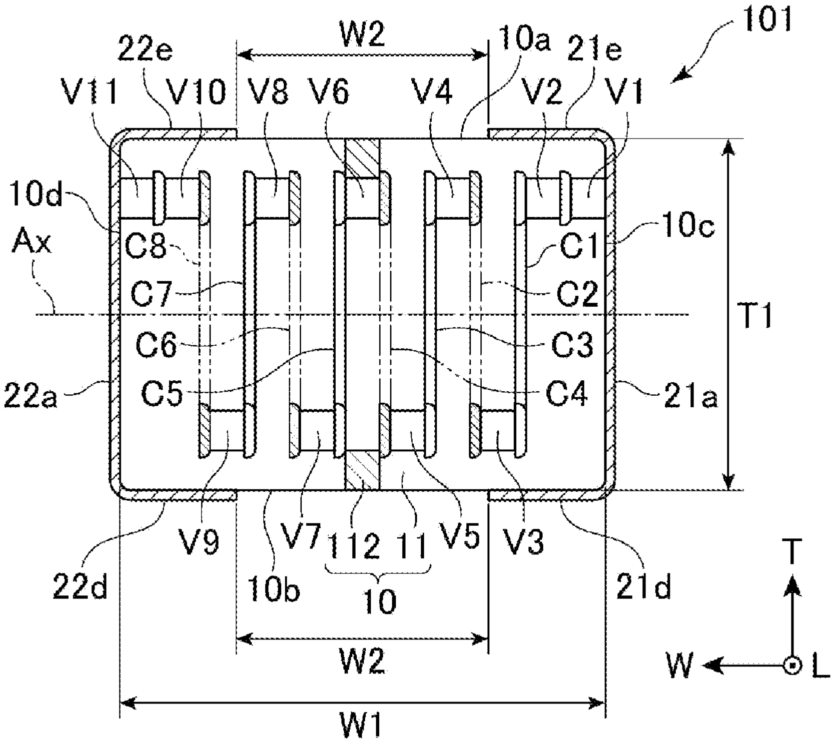
FIG. 3A is a cross sectional view schematically showing a cross section of a coil component according to another embodiment of the present invention, cut along a plane extending along the coil axis.
Figure 3B:
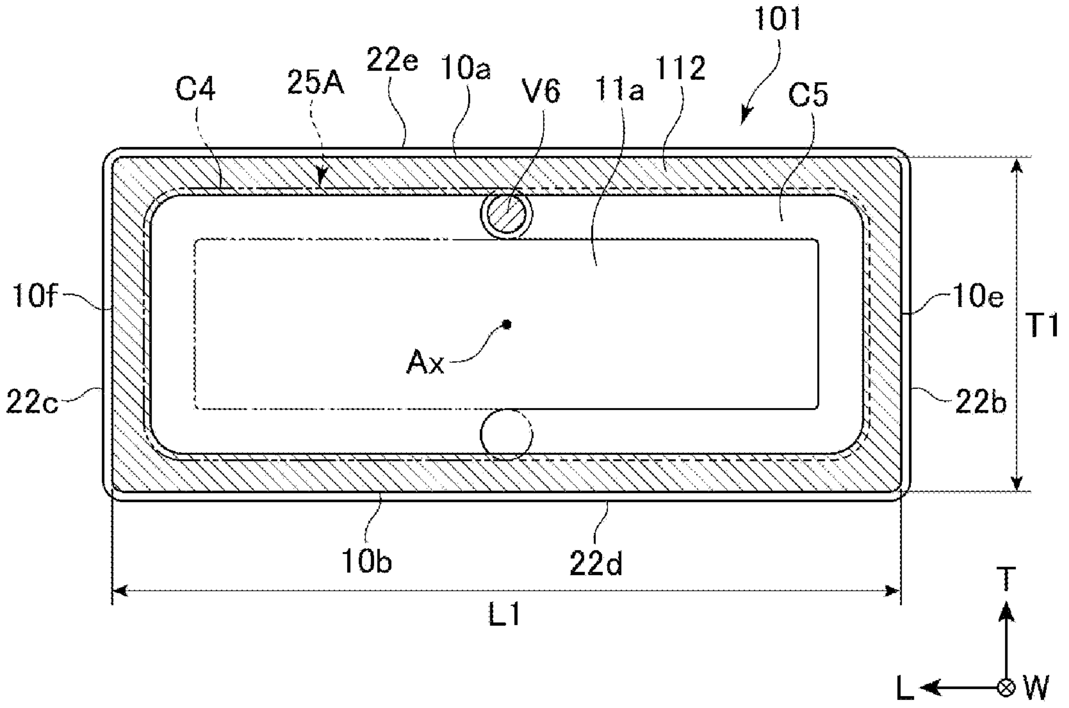
FIG. 3B is a cross sectional view schematically showing a cross section of the coil component in FIG. 3A, cut along a plane perpendicular to the coil axis.

Next, a coil component 101 according to another embodiment of the present invention will be described with reference to FIGS. 3A and 3B. FIGS. 3A and 3B show cross sectional views of the coil component 101 respectively. FIG. 3A shows a cross section of the coil component 101 cut along a plane along which the coil axis Ax extends. FIG. 3B shows a cross section of the coil component 101 cut along a plane to which the coil axis Ax is perpendicular. The coil component 101 differs from the coil component 1 in that it includes a high resistance portion 112 instead of the high resistance portion 12.

Figure 4A:
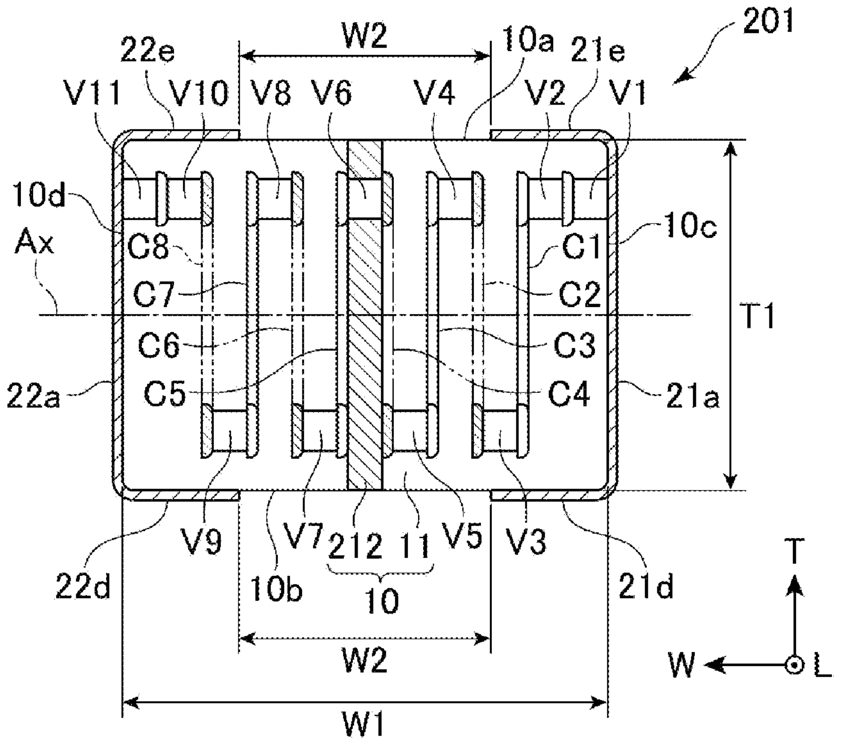
FIG. 4A is a cross sectional view schematically showing a cross section of a coil component according to still another embodiment of the present invention, cut along a plane extending along the coil axis.
Figure 4B:
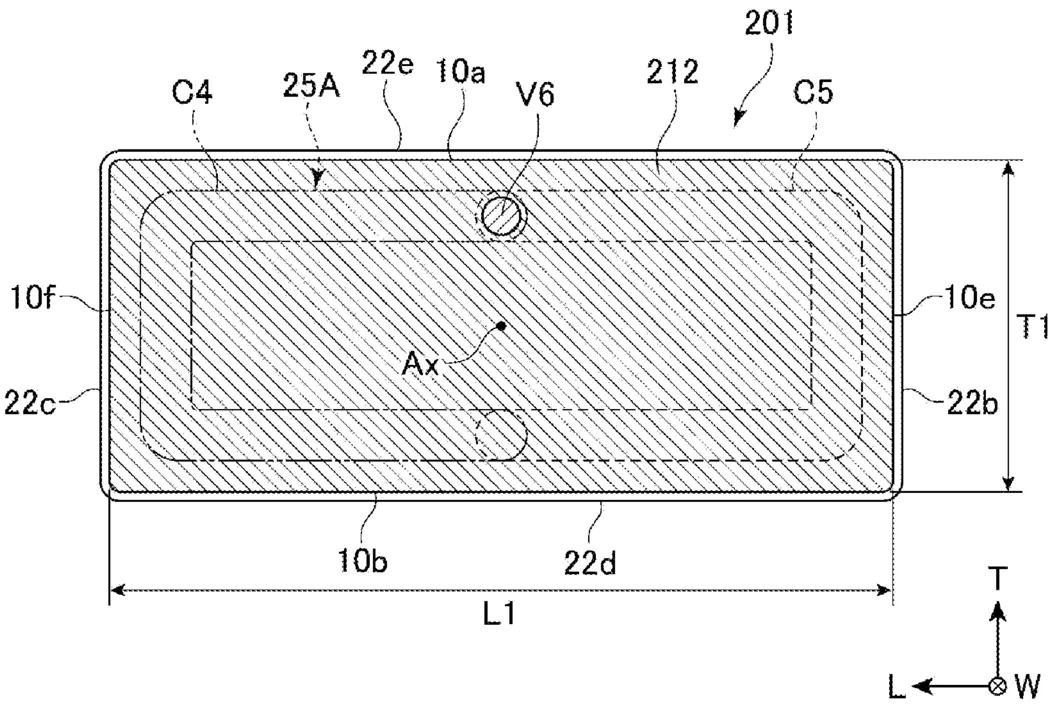
FIG. 4B is a cross sectional view schematically showing a cross section of the coil component in FIG. 4A, cut along a plane perpendicular to the coil axis.

As shown in FIG. 3A and FIG. 3B, the circling portion 25A has a circumferential surface opposite to the connecting surface of the base body 10 (i.e., the top surface 10*a*, the bottom surface 10*b*, the first side surface 10*e*, and the second side surface 10*f*). The high resistance portion 112 extends from the connecting surface of the base body 10 to the circumferential surface of the circling portion 25A in a radial direction having the coil axis Ax as a center. The high resistance portion 112 prevents a leak current from flowing between the external electrode 21 and the external electrode 22 through inside of the connecting surface of the base body 10, which is an inner side of the base body 10 in the radial direction having the coil axis Ax as a center. Accordingly, the coil component 101 can further increase a dielectric strength voltage between the external electrode 21 and the external electrode 22, Next, a coil component 201 according to still another embodiment of the present invention will be described with reference to FIGS. 4A and 4B. FIGS. 4A and 4B show cross sectional views of the coil component 201 respectively. FIG. 4A shows a cross section of the coil component 201 cut along a plane along which the coil axis Ax extends. FIG. 4B shows a cross section of the coil component 201 cut along a plane to which the coil axis Ax is perpendicular. The coil component 201 differs from the coil component 1 in that it includes a high resistance portion 212 instead of the high resistance portion 12.

As shown in FIG. 4A and FIG. 4B, the high resistance portion 212 extends from the connecting surface of the base body 10 to the coil axis Ax in a radial direction having the coil axis Ax as a center. Therefore, the high resistance portion 212 occupies a part of a core area 10N of the base body 10.

The high resistance portion 212 prevents a leak current from flowing between the external electrode 21 and the external electrode 22 through the core area 10N of the base body 10. For example, it is possible to prevent a leak current from flowing between the main electrode portion 21*a* of the external electrode 21 and the main electrode portion 22*a* of the external electrode 22. A precursor of the high resistance portion 212 can be easily fabricated by mixing and kneading metal magnetic particles with a resin to obtain slurry, compressing the slurry to form a sheet, and forming on the sheet a through-hole for disposing a via conductor V6. Specifically, when the coil component 201 is manufactured by the sheet lamination method, it is not necessary to form a through-hole to be filled with a precursor of the high resistance portion 212 of the magnetic sheet. Accordingly, the coil component 201 can be manufactured by a simpler process than the coil component 1

In the illustrated embodiment, a single high resistance portion 212 is disposed between the conductor pattern C4 and the conductor pattern C5. Alternatively, the coil component 201 may include plural high resistance portions 212. For example, the coil component 201 may include another high resistance portion 212 between the conductor pattern C2 and the conductor pattern C3.

Figure 5:
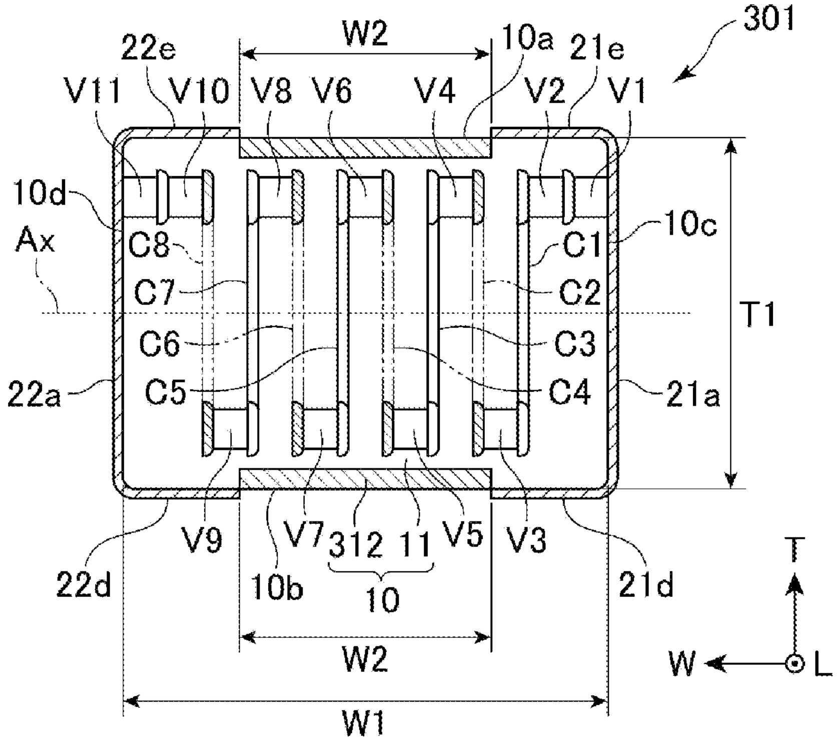
FIG. 5 is a cross sectional view schematically showing a cross section of a coil component according to still another embodiment of the present invention, cut along a plane extending along the coil axis.

Next, a coil component 301 according to still another embodiment of the present invention will be described with reference to FIG. 5. FIG. 5 shows a cross sectional view of the coil component 301. FIG. 5 shows a cross section of the coil component 301 cut along a plane extending along the coil axis Ax. The coil component 301 differs from the coil component 1 in that it includes a high resistance portion 312 instead of the high resistance portion 12.

In the embodiment shown in FIG. 5, the high resistance portion 312 occupies an entire area between the external electrode 21 and the external electrode 22 on the connecting surface of the base body 10. Specifically, the high resistance portion 312 extends from the positive side ends of the flange portions 21*b* to 21*e* in the W-axis direction to the negative side ends of corresponding ones of the flange portions 22*a* to 22*e* in the W-axis direction. Accordingly, an entire area of the connecting surface of the base body 10 is occupied by the high resistance portion 312. In the coil component 301, the outer surface of the main body portion 11 of the base body 10 is covered by the external electrode 21, the external electrode 22, and the high resistance portion 312.

The coil component 301 has the high resistance portion 312 occupying an entire area of the connecting surface of the base body 10 between the external electrode 21 and the external electrode 22. This can make sure to prevent a leak current from flowing along the connecting surface of the base body 10 between the external electrode 21 and the external electrode 22. Accordingly, the coil component 301 can further increase a dielectric strength voltage between the external electrode 21 and the external electrode 22.

Figure 6:
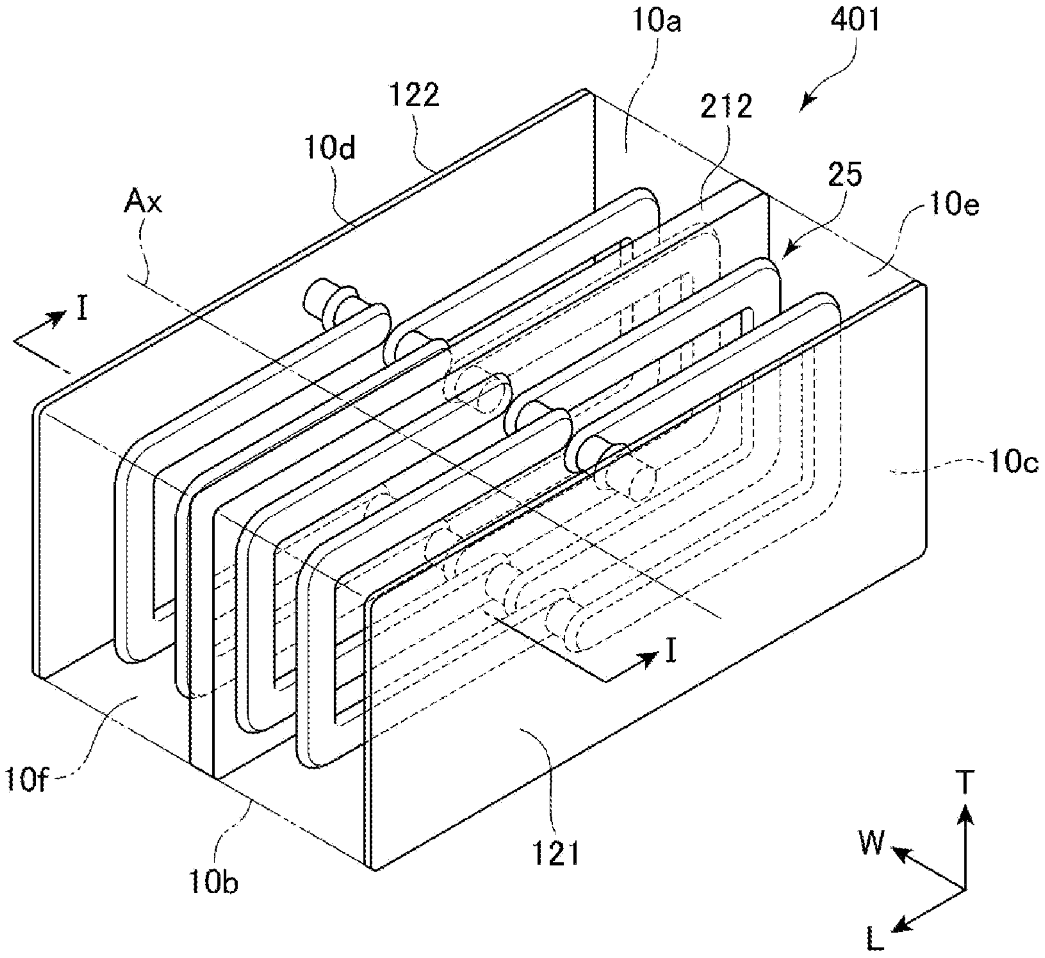
FIG. 6 is a perspective view schematically showing a coil component according to still another embodiment of the present invention.
Figure 7:
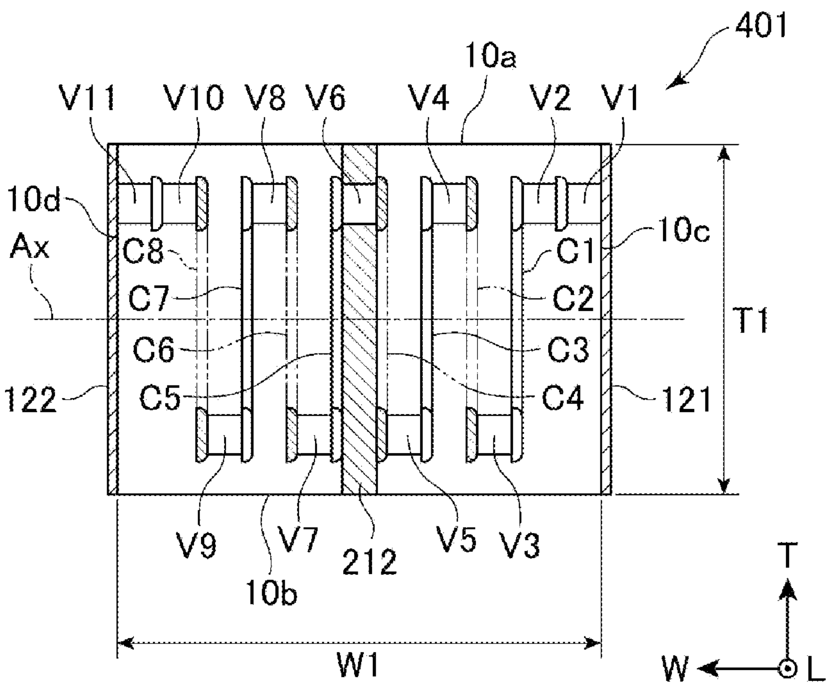
FIG. 7 is a cross sectional view schematically showing a cross section of the coil component in FIG. 6, cut along a plane extending along the coil axis.

Next, a coil component 401 according to still another embodiment of the present invention will be described with reference to FIGS. 6 and 7. FIG. 6 is a perspective view schematically showing the coil component 401. FIG. 7 shows a cross section of the coil component 401 in FIG. 6, cut along the line I-I. The coil component 401 differs from the coil component 201 in that it includes an external electrode 121 instead of the external electrode 21 and an external electrode 122 instead of the external electrode 22.

As shown in FIG. 6 and FIG. 7, the external electrode 121 covers only the first end surface 10*c* of the base body 10, and the external electrode 122 covers only the second end surface 10*d* of the base body 10. In the illustrated embodiment, the external electrode 121 covers the entire surface of the first end surface 10*c* of the base body 10, and the external electrode 122 covers the entire surface of the second end surface 10*d* of the base body 10. The external electrode 121 may cover only a part of the first end surface 10*c* of the base body 10, and the external electrode 122 may cover only a part of the second end surface 10*d* of the base body 10. The external electrode 121 is extended to a bottom end of the first end surface 10*c*, and the external electrode 121 is connected to the land portion 3*a* at the bottom end. As with the external electrode 121, the external electrode 122 is extended to a bottom end of the second end surface 10*d*, and the external electrode 122 is connected to the land portion 3*b* at the bottom end.

As is the case with the coil component 401 where the external electrode 121 covers only the first end surface 10*c* of the base body 10 and the external electrode 122 covers only the second end surface 10*d* of the base body 10, a leak current is likely to flow between the external electrode 121 and the external electrode 122 not only on the connecting surface but also inside of the base body 10. According to the coil component 401, the high resistance portion 212 extending from the connecting surface of the base body 10 to the coil axis Ax can prevent a leak current from flowing through inside of the base body 10 (for example, through the core area 10N).

Figure 8:
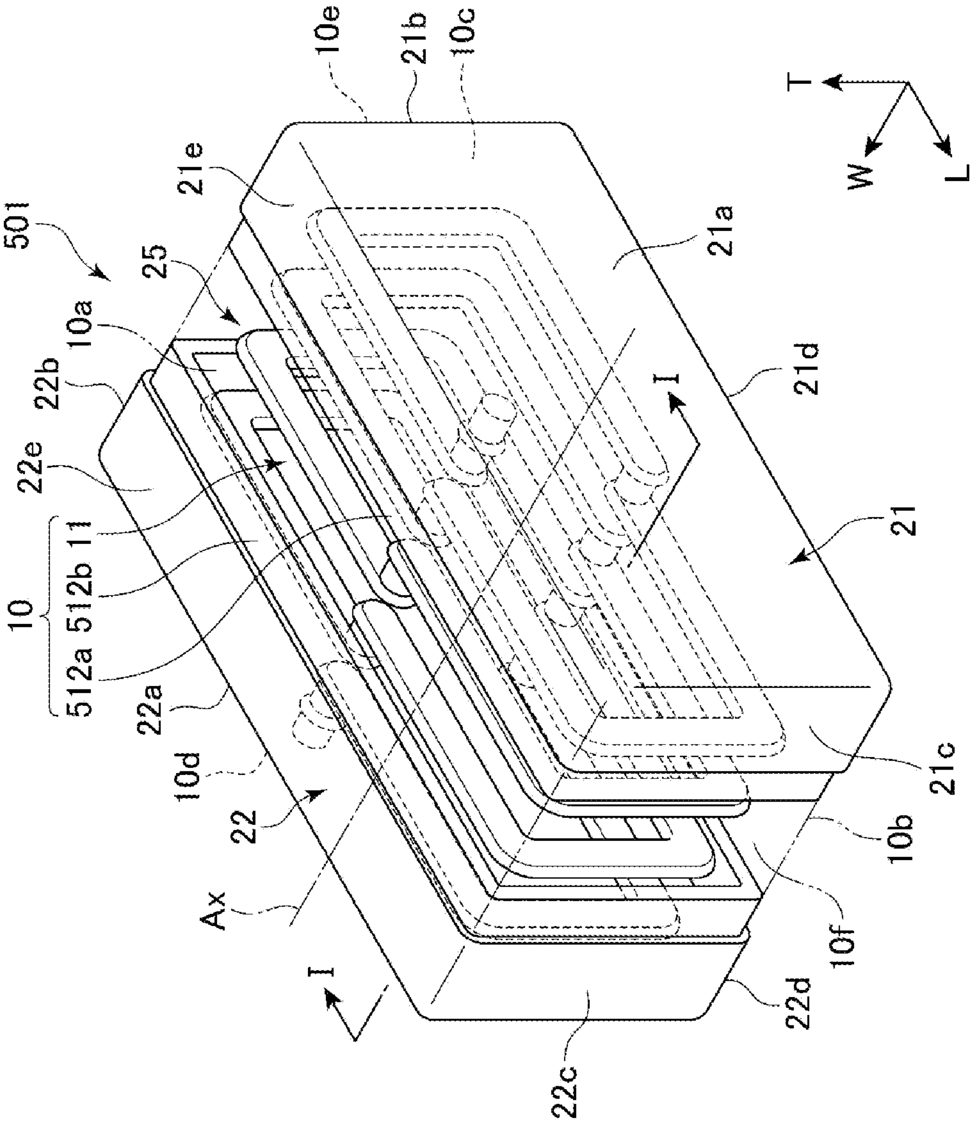
FIG. 8 is a perspective view schematically showing a coil component according to still another embodiment of the present invention.
Figure 9:
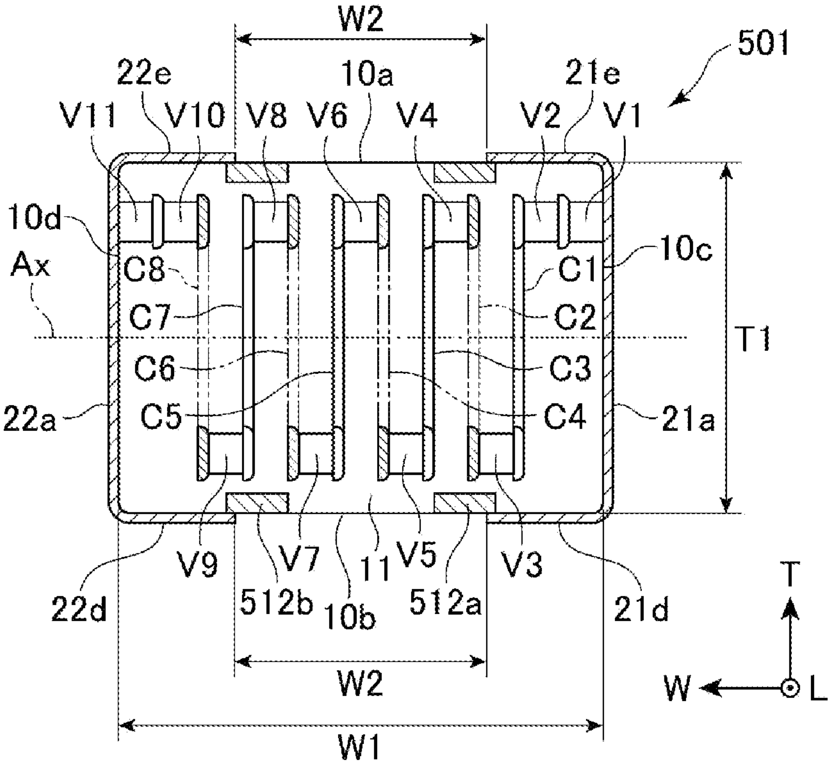
FIG. 9 is a cross sectional view schematically showing a cross section of the coil component in FIG. 8, cut along a plane extending along the coil axis.
Figure 10:
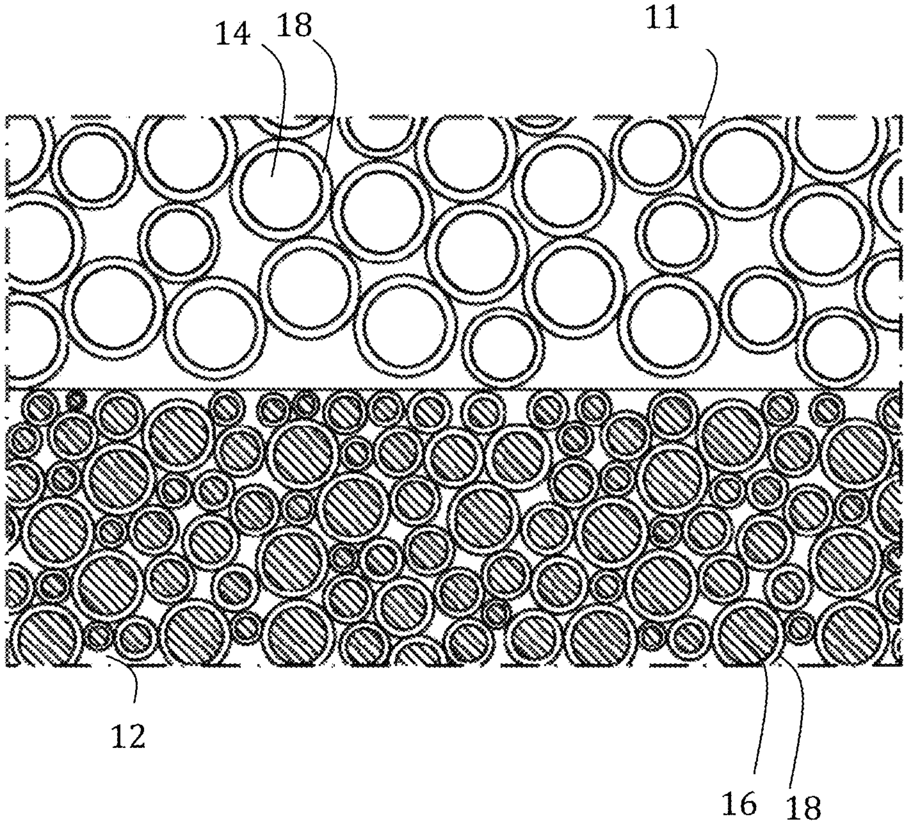
FIG. 10 is a detailed view of a portion of the cross section shown in FIG. 2B, showing magnetic particles of the base body in accordance with an embodiment.

Next, a coil component 501 according to still another embodiment of the present invention will be described with reference to FIGS. 8 and 9. FIG. 8 is a perspective view schematically showing the coil component 501. FIG. 9 shows a cross section of the coil component 501 in FIG. 8, cut along the line I-I. The coil component 501 differs from the coil component 1 in that it includes a high resistance portion 512*a* and a high resistance portion 512*b* instead of the high resistance portion 12.

As shown in FIG. 8 and FIG. 9, the high resistance portion 512*a* is disposed to contact the external electrode 21, and the high resistance portion 512*b* is disposed to contact the external electrode 22. In the illustrated embodiment, at least a part of the outer surface of the high resistance portion 512*a* contacts an inner circumferential surface of each of the flange portions 21*b* to 21*e*, and at least a part of the outer surface of the high resistance portion 512*b* contacts an inner circumferential surface, which is a surface of the base body 10 side, of each of the flange portions 22*b*. In at least one embodiment of the present invention, the high resistance portion 512*a* extends from the positive side ends of the flange portions 21*b* to 21*e* of the external electrode 21 in the W-axis direction toward a positive side in the W-axis direction. In at least one embodiment of the present invention, the high resistance portion 512*b* extends from the negative side ends of the flange portions 22*b* to 22*e* of the external electrode 22 in the W-axis direction toward a negative side in the W-axis direction According to the coil component 501, the high resistance portion 512*a* and the high resistance portion 512*b* prevent a leak current from flowing between the external electrode 21 and the external electrode 22 along the connecting surface of the base body 10. In a case where electrolytic plating is used for forming the external electrode 21 and the external electrode 22, it is possible to suppress expansion of the plating to the connecting surface of the base body 10. If the plating expands beyond a predetermined area on the external electrode 21 and the external electrode 22 to reach the connecting surface of the base body 10, a short circuit can occur between the external electrode 21 and the external electrode 22. Accordingly, the high resistance portion 512*a* and the high resistance portion 512*b* have such a function that can prevent the plating from expanding to the connecting surface of the base body 10 during the manufacturing process of the coil component 501, in addition to a function of increasing resistance between the external electrode 21 and the external electrode 22.

The dimensions, material, and arrangement of the elements described herein are not limited to those explicitly described for the embodiments. The elements are susceptible of modifications for desired dimensions, materials, and arrangements within the scope of the present invention.

Constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. A coil component comprising:

a coil conductor including a circling portion extending around a coil axis;

a base body having an outer surface, the outer surface including a first surface, a second surface, and a connecting surface, the first surface intersecting the coil axis and having a long side and a short side, the second surface being opposite to the first surface and spaced apart from the first surface with a distance shorter than the long side, the connecting surface connecting the first surface with the second surface, the base body covering at least the circling portion of the coil conductor;

a first external electrode disposed on the first surface and connected to one end of the coil conductor; and a second external electrode disposed on the second surface and connected to the other end of the coil conductor, wherein the base body includes a main body portion and at least one high resistance portion, the main body portion including plural metal magnetic particles and occupying a part of the connecting surface, the at least one high resistance portion occupying an area of the connecting surface other than the part occupied by the main body portion between the first external electrode and the second external electrode, the area extending along an entire length of a circumference of the base body around the coil axis, the at least one high resistance portion having a higher volume resistivity than the main body portion, wherein the at least one high resistance portion is spaced apart from both the first external electrode and the second external electrode, and wherein the first and second external electrodes only contact the first and second end surfaces.

2. The coil component according to claim 1, wherein the circling portion has an outer circumferential surface opposite to the connecting surface of the base body, and the at least one high resistance portion extends from the connecting surface to the outer circumferential surface of the circling portion.

3. The coil component according to claim 2, wherein the at least one high resistance portion further extends to an inner area of the circling portion.

4. The coil component according to claim 1, wherein the at least one high resistance portion occupies an entire area of the connecting surface between the first external electrode and the second external electrode.

5. The coil component according to claim 1, wherein the at least one high resistance portion includes a first high resistance portion and a second high resistance portion disposed nearer to the second surface than the first high resistance portion.

6. The coil component according to claim 1, wherein the first external electrode includes a first plated layer, and the at least one high resistance portion is disposed to contact the first external electrode.

7. The coil component according to claim 1, wherein the second external electrode includes a second plated layer, and the at least one high resistance portion is disposed to contact the second external electrode.

8. The coil component according to claim 1, wherein each of the plural metal magnetic particles included in the main body portion includes Fe and at least one element out of Si, Ti, and Zr, the at least one high resistance portion includes plural other metal magnetic particles, each of the plural other metal magnetic particles includes Fe and at least one element out of Si, Ti, and Zr, and a content ratio of a total of Si, Ti and Zr to Fe in each of the plural other metal magnetic particles included in the at least one high resistance portion is higher than a content ratio of a total of Si, Ti and Zr to Fe in each of the plural metal magnetic particles included in the main body portion.

9. The coil component according to claim 1, wherein the at least one high resistance portion includes plural other metal magnetic particles, and each of the plural other metal magnetic particles includes on a surface thereof an insulating film consisting of insulating material.

10. The coil component according to claim 1, wherein the at least one high resistance portion includes plural other metal magnetic particles, and the plural other metal magnetic particles have a smaller average particle size than the plural metal magnetic particles included in the main body portion.

11. The coil component according to claim 1, wherein a relative magnetic permeability of the at least one high resistance portion is 10% or greater of a relative magnetic permeability of the main body portion.

12. The coil component according to claim 1, wherein a relative magnetic permeability of the at least one high resistance portion is less than 10% of a relative magnetic permeability of the main body portion.

13. A circuit board comprising the coil component according to claim 1.

14. An electronic device comprising the circuit board according to claim 13.

* * * * *